(12) United States Patent
Xie et al.

(10) Patent No.: US 12,450,741 B2
(45) Date of Patent: Oct. 21, 2025

(54) METHOD AND APPARATUS FOR IDENTIFICATION OF FETAL CROSS-SECTIONS BASED ON ULTRASOUND DYNAMIC IMAGES

(71) Applicant: GUANGZHOU AIYUNJI INFORMATION TECHNOLOGY CO., LTD., Guangdong (CN)

(72) Inventors: Hongning Xie, Guangdong (CN); Nan Wang, Guangdong (CN); Jianbo Xian, Guangdong (CN); Zhe Liang, Guangdong (CN); Shuyu Liu, Guangdong (CN); Yanqi Yang, Guangdong (CN); Jielin Wu, Guangdong (CN)

(73) Assignee: GUANGZHOU AIYUNJI INFORMATION TECHNOLOGY CO., LTD., Guangzhou (CN)

( * ) Notice: Subject to any disclaimer, the term of this patent is extended or adjusted under 35 U.S.C. 154(b) by 354 days.

(21) Appl. No.: 18/126,381

(22) Filed: Mar. 24, 2023

(65) Prior Publication Data
US 2023/0230238 A1 Jul. 20, 2023

Related U.S. Application Data

(63) Continuation of application No. PCT/CN2021/096824, filed on May 28, 2021.

(30) Foreign Application Priority Data

Sep. 24, 2020 (CN) .......................... 202011017783.6

(51) Int. Cl.
G06T 7/00 (2017.01)
G06V 10/26 (2022.01)
G06V 10/44 (2022.01)

(52) U.S. Cl.
CPC .......... *G06T 7/0012* (2013.01); *G06V 10/273* (2022.01); *G06V 10/443* (2022.01);
(Continued)

(58) Field of Classification Search
CPC ......... G06T 7/0012; G06T 2207/10132; G06T 2207/3004; G06T 2207/20084; G06T 7/73;
(Continued)

(56) References Cited

U.S. PATENT DOCUMENTS

2018/0103912 A1* 4/2018 Canfield ................. G16H 50/30
2019/0035118 A1* 1/2019 Zhao ..................... G06T 3/4076
(Continued)

FOREIGN PATENT DOCUMENTS

| CN | 110742654 A | | 2/2020 | |
| CN | 111462060 | * | 7/2020 | ............... A61B 8/08 |
| CN | 111462060 A | | 7/2020 | |

OTHER PUBLICATIONS

International Search Report of PCT Patent Application No. PCT/CN2021/096824 issued on Sep. 1, 2021.

*Primary Examiner* — Tom Y Lu

(57) ABSTRACT

Disclosed in the present invention are a method and apparatus for the identification of fetal cross-sections based on ultrasound dynamic images; the method includes: inputting sequentially each frame of fetal ultrasound images from acquired multiple consecutive frames of fetal ultrasound images into a predetermined feature-detecting model for analysis; acquiring a sequentially exported analysis from the feature-detecting model as feature information for each frame of fetal ultrasound images; corresponding to each frame of fetal ultrasound images, identifying a cross-section by the categories of the part and the structural feature. Obviously, for a fetal ultrasound image, the implementation of the present invention may improve the identified accu-
(Continued)

racy, identified efficiency, and the standardization of the cross-section, by acquiring the part features and structural features from consecutive multi-frame fetal ultrasound images and identifying the cross-section by combining the part features and structural features.

17 Claims, 4 Drawing Sheets

(52) U.S. Cl.
CPC ............... *G06T 2207/10132* (2013.01); *G06T 2207/30044* (2013.01)

(58) Field of Classification Search
CPC .. G06T 11/003; G06V 10/273; G06V 10/443; G06V 2201/03; G06V 2201/12; G06V 10/16; G06V 10/82; G06V 10/42; A61B 8/523; A61B 8/0866; G06F 18/2113
See application file for complete search history.

(56) References Cited

U.S. PATENT DOCUMENTS

2020/0155114 A1\* 5/2020 Park .................. A61B 8/463
2020/0261053 A1\* 8/2020 Park .................. A61B 8/5207

\* cited by examiner

METHOD AND APPARATUS FOR IDENTIFICATION OF FETAL CROSS-SECTIONS BASED ON ULTRASOUND DYNAMIC IMAGES

CROSS REFERENCE TO RELATED APPLICATIONS

The present application is a Continuation application of PCT Application No. PCT/CN2021/096824 filed on May 28, 2021, which claims the benefit of Chinese Patent Application No. 202011017783.6 filed on Sep. 24, 2020. All the above are hereby incorporated by reference in their entirety.

FIELD OF THE INVENTION

The present invention relates to the technical field of image processing, and in particular to a method and apparatus for the identification of fetal cross-sections based on ultrasound dynamic images.

BACKGROUND OF THE INVENTION

The fetal section becomes a key point for the accurate identification of the gestational week since the fetal growth may be known from the fetal cross-section. The current method for identification of a fetal cross-section is: identifying the fetal section directly by analyzing a single fetal ultrasound image, or further analyzing the fetal cross-section by experienced and relevant personnel after the fetal cross-section is acquired so as to achieve the final identification of the fetal section.

However, it has been found in practice that acquisition of a less accurate fetal section may be easily led due to the identification of the fetal section directly from a single ultrasound image with a relatively small data volume and the limited experience and/or fatigue in the working of the relevant personnel, whereby the fetal growth and development may not be accurately identified. Therefore, it is particularly important to acquire an accurate fetal section.

SUMMARY OF INVENTION

The technical problem to be solved by the present invention is to provide a method and apparatus for the identification of fetal cross-sections based on ultrasound dynamic images, which may acquire an accurate fetal cross-section.

In order to solve the above technical problems, as a first aspect, disclosed in the present invention is a method for identification of fetal cross-sections based on ultrasound dynamic images, the method comprising: inputting each frame of a fetal ultrasound image from acquired multiple consecutive frames of fetal ultrasound images sequentially into a predetermined feature-detecting model for analysis; acquiring a sequentially exported analysis analyzed by the feature-detecting model as feature information for each frame of fetal ultrasound images; for each frame of fetal ultrasound images, the feature information comprising information on a part feature and a structural feature, the information on the part feature comprising at least a category of the part feature, the information on the structural feature comprising at least a category of the structural feature, each structural feature comprising at least a critical structural feature; and identifying a fetal cross-section by the categories of the part feature and the structural feature.

As an optional embodiment, in the first aspect of the present invention, after acquisition of the sequentially exported analysis of the feature-detecting model as feature information for each frame of fetal ultrasound images, the method further comprises: detecting all fetal ultrasound images to determine whether or not there exists a targeted fetal ultrasound image in which the features do not match the feature information of fetal ultrasound images; when yes, filtering all fetal ultrasound images to get all targeted fetal ultrasound images; eliminating, in each frame of the targeted fetal ultrasound image, the features not matching the feature information based on a predetermined feature-eliminating method; and acquiring the targeted fetal ultrasound image without the features not matching the feature information.

As an optional embodiment, in the first aspect of the present invention, elimination, in each frame of the targeted fetal ultrasound image, of the features not matching the feature information based on the predetermined feature-eliminating method and the acquisition of the targeted fetal ultrasound image without the features not matching the feature information comprise: acquiring an average grayscale value in each frame of the targeted fetal ultrasound image, a plurality of former frames thereof, and a plurality of latter frames thereof; eliminating the feature information on the targeted fetal ultrasound image based on the average grayscale value of each frame of the targeted fetal ultrasound image to acquire the targeted fetal ultrasound image without the features not matching the feature information; or identifying locations of the features not matching the feature information of each frame of the targeted fetal ultrasound image, and deleting the features not matching the feature information based on corresponding locations to acquire the targeted fetal ultrasound image without the features not matching the feature information.

As an optional embodiment, in the first aspect of the present invention, after identification of the fetal cross-section by the categories of the part feature and the structural feature in each frame of fetal ultrasound images, the method further comprises: detecting the cross-section corresponding to each frame of fetal ultrasound images to determine whether or not there exist features not matching the cross-section, and, when yes, deleting the features not matching the cross-section.

As an optional embodiment, in the first aspect of the present invention, structural features of each frame of fetal ultrasound images further comprise a confidence level of structural features and a location probability of structural features, the location probability of each structural feature being the probability of the structural feature showing in a particular position of corresponding fetal ultrasound images; the method further comprises: identifying a cross-sectional score for cross-sections corresponding to a present frame of fetal ultrasound images based on, in the present frame of fetal ultrasound images, the confidence level of structural features, the location probability of structural features, and a weighted value of structural features; determining whether or not the cross-sectional score of the cross-section corresponding to the present frame of fetal ultrasound images is higher than that of a determined optimal cross-section, the optimal cross-section being the one with a highest cross-sectional score; when yes, updating a frame number of the present cross-section corresponding to the present frame of fetal ultrasound images as the one of the optimal cross-section, there being only one frame number for each frame of fetal ultrasound images; and, when no, acquiring a next frame of fetal ultrasound images as the present one, and identifying the cross-sectional score for the cross-section corresponding to the present one based on the confidence level, the location probability, and the weighted value of structural features in the present one.

As an optional embodiment, in the first aspect of the present invention, after acquisition of the sequentially exported analysis of the feature-detecting model as feature information for each frame of fetal ultrasound images, the method further comprises: detecting the structural feature of each frame of fetal ultrasound images to determine whether or not there exist a suspected abnormal structural feature; when yes, acquiring targeted information on each suspected abnormal structural feature of fetal ultrasound images, used for confirming whether or not the suspected abnormal structural feature is an abnormal structural feature; determining whether or not the suspected abnormal structural features satisfy predetermined conditions for identification of the abnormal structural feature based on the targeted information on each suspected abnormal structural feature; when yes, confirming that the suspected abnormal structural feature is the abnormal structural feature; and confirming that the cross-section corresponding to each abnormal structural feature is an abnormal cross-section.

As an optional embodiment, in the first aspect of the present invention, the determination of whether or not the suspected abnormal structural features satisfy the predetermined conditions for identification of the abnormal structural feature based on the targeted information on each suspected abnormal structural feature comprises: identifying an abnormal manifestation type, which manifests as a numerical manifestation type or a morphological manifestation type, corresponding to the suspected abnormal structural feature, based on the targeted information on each suspected abnormal structural feature; acquiring a value of geometric parameters corresponding to the suspected abnormal structural feature when the abnormal manifestation type thereof manifests as the numerical manifestation type; determining whether or not the value of geometric parameters corresponding to the suspected abnormal structural feature falls within a predetermined normal range of the parameters; when no, confirming that the suspected abnormal structural features satisfy the predetermined conditions for identification of the abnormal structural feature; for each suspected abnormal structural feature, the geometric parameters comprising a transverse diameter and/or a perimeter; determining whether or not the suspected abnormal structural features locate in a detecting area corresponding to the part feature of the suspected abnormal structural feature, when the abnormal structural feature of the suspected abnormal structural feature manifests as the morphological manifestation type; and, when no, confirming that the suspected abnormal structural features satisfy the predetermined conditions for identification of the abnormal structural feature.

As an optional embodiment, in the first aspect of the present invention, the acquisition of the value of geometric parameters corresponding to the suspected abnormal structural feature comprises: for each frame of fetal ultrasound images, the feature information further comprising the information on contour; determining whether or not the feature-detecting model is a predetermined and contour-identifiable feature-detecting model; when yes, acquiring the value of geometric parameters corresponding to the suspected abnormal structural feature based on contour information on the suspected abnormal structural feature; and, when no, inputting fetal ultrasound images corresponding to the suspected abnormal structural feature into the contour-identifiable feature-detecting model for analysis to acquire contour information analyzed by the contour-identifiable feature-detecting model as the contour information on structural features of fetal ultrasound images corresponding to the suspected abnormal structural feature and acquiring the value of geometric parameters corresponding to the suspected abnormal structural feature based on the contour information on the suspected abnormal structural feature.

As a second aspect, disclosed in the present invention is an apparatus for identification of fetal cross-sections based on ultrasound dynamic images, the apparatus comprising an analyzing module, used for sequentially inputting each frame of a fetal ultrasound image from acquired multiple consecutive frames of fetal ultrasound images into a predetermined feature-detecting model for analysis; an acquiring module, used for acquiring a sequentially exported analysis analyzed by the feature-detecting model as feature information for each frame of fetal ultrasound images; for each frame of fetal ultrasound images, the feature information comprising information on a part feature and a structural feature, the information on the part feature comprising at least a category of the part feature, the information on the structural feature comprising at least a category of the structural feature; and an identifying module, used for identifying the category of the part feature, the category of the structural feature and a cross-section corresponding to fetal ultrasound images, based on each frame of fetal ultrasound images.

As an optional embodiment, as a second aspect in the present invention, the apparatus further comprises: a first detecting module, used for detecting all fetal ultrasound images to determine whether or not there exists a targeted fetal ultrasound image in which the features do not match the feature information of fetal ultrasound images, after acquisition of the sequentially exported analysis of the feature-detecting model as feature information for each frame of fetal ultrasound images; a filtering module, used for filtering all fetal ultrasound images to get all targeted fetal ultrasound images, when the first detecting module detects that the targeted fetal ultrasound image exist; and an eliminating module, used for eliminating, in each frame of the targeted fetal ultrasound image, the features not matching the feature information based on a predetermined feature-eliminating method, and acquiring the targeted fetal ultrasound image without the features not matching the feature information.

As an optional embodiment, as a second aspect in the present invention, the eliminating module eliminates, in each frame of the targeted fetal ultrasound image, the features not matching the feature information based on the predetermined feature-eliminating method, and acquiring the targeted fetal ultrasound image without the features not matching the feature information, which specifically comprises steps as follows: acquiring an average grayscale value in each frame of the targeted fetal ultrasound image, a plurality of former frames thereof, and a plurality of latter frames thereof; eliminating the feature information on the targeted fetal ultrasound image based on the average grayscale value of each frame of the targeted fetal ultrasound image to acquire the targeted fetal ultrasound image without the features not matching the feature information; or identifying locations of the features not matching the feature information of each frame of the targeted fetal ultrasound image, and deleting the features not matching the feature information based on corresponding locations to acquire the targeted fetal ultrasound image without the features not matching the feature information.

As an optional embodiment, as a second aspect in the present invention, the apparatus further comprises: a second detecting module, used for that the identifying module detects the cross-section corresponding to each frame of fetal ultrasound images to determine whether or not there exist features not matching the cross-section, after identification of the fetal cross-section by the categories of the part feature and the structural feature in each frame of fetal ultrasound images; and a deleting module, used for deleting the features not matching the cross-section, when the second detecting module detects that features not matching the cross-section exist.

As an optional embodiment, as a second aspect in the present invention, structural features of each frame of fetal ultrasound images further comprise a confidence level of structural features and a location probability of structural features, the location probability of each structural feature being the probability of the structural feature showing in a particular position of corresponding fetal ultrasound images; the apparatus further comprises: the identifying module, further used for identifying a cross-sectional score, for cross-sections corresponding to a present frame of fetal ultrasound images, based on, in the present frame of fetal ultrasound images, the confidence level of structural features, the location probability of structural features, and a weighted value of structural features; a first determining module, used for determining whether or not the cross-sectional score of the cross-section corresponding to the present frame of fetal ultrasound images is higher than that of a determined optimal cross-section, the optimal cross-section being the one with a highest cross-sectional score; an updating module, used for updating a frame number of the present cross-section corresponding to the present frame of fetal ultrasound images as the one of the optimal cross-section, when a determination result of the first determining module is positive, there being only one frame number for each frame of fetal ultrasound images; and the acquiring module, further used for acquiring the next frame of fetal ultrasound images as the present one, and the identifying module identifies the cross-sectional score for the cross-section corresponding to the present one based on the confidence level, the location probability, and the weighted value of structural features in the present one, when a determination result of the first determining module is negative.

As an optional embodiment, as a second aspect in the present invention, the apparatus further comprises: a third detecting module, used for detecting the structural feature of each frame of fetal ultrasound images to determine whether or not there exist a suspected abnormal structural feature, after the acquiring module acquires the sequentially exported analysis of the feature-detecting model as feature information for each frame of fetal ultrasound images; the acquiring module, further used for acquiring targeted information on each suspected abnormal structural feature of fetal ultrasound images, the targeted information being used for confirming whether or not the suspected abnormal structural feature is an abnormal structural feature, when the third detecting module detects that suspected abnormal structural features exist within the structural feature of fetal ultrasound images; a second determining module, used for determining whether or not the suspected abnormal structural features satisfy predetermined conditions for identification of the abnormal structural feature based on the targeted information on each suspected abnormal structural feature; and the identifying module, further used for confirming that the suspected abnormal structural feature is the abnormal structural feature and confirming that the cross-section corresponding to each abnormal structural feature is an abnormal cross-section, when a determination result of the second determining module is positive.

As an optional embodiment, as a second aspect in the present invention, the second determining module comprises: an identifying sub-module, used for identifying an abnormal manifestation type manifesting as a numerical manifestation type or a morphological manifestation type, corresponding to the suspected abnormal structural feature, based on the targeted information on each suspected abnormal structural feature; an acquiring sub-module, used for acquiring a value of geometric parameters corresponding to the suspected abnormal structural feature when the abnormal manifestation type thereof manifests as the numerical manifestation type; a determining sub-module, used for determining whether or not the value of geometric parameters corresponding to the suspected abnormal structural feature falls within a predetermined normal range of the parameters.

The identifying sub-module is further used for confirming that the suspected abnormal structural features satisfy the predetermined conditions for identification of the abnormal structural feature; for each suspected abnormal structural feature, the geometric parameters comprising a transverse diameter and/or a perimeter, when the determining sub-module determines that the geometric parameters corresponding to the suspected abnormal structural feature do not fall within a predetermined normal range of the parameters.

The determining sub-module is further used for determining whether or not the suspected abnormal structural features locate in a detecting area corresponding to the part feature of the suspected abnormal structural feature, when the abnormal structural feature of the suspected abnormal structural feature manifests as the morphological manifestation type.

The identifying sub-module is further used for confirming that the suspected abnormal structural features satisfy the predetermined conditions for identification of the abnormal structural feature, when the determining sub-module determines that the suspected abnormal structural feature does not locate in a detecting area corresponding to the part feature of the suspected abnormal structural feature.

As an optional embodiment, as a second aspect in the present invention, the acquiring sub-module acquires the geometric parameters corresponding to the suspected abnormal structural feature, which specifically comprises steps as follows: for each frame of fetal ultrasound images, the structural feature information further comprises the information on a contour; determining whether or not the feature-detecting model is a predetermined and contour-identifiable feature-detecting model; when yes, acquiring the value of geometric parameters corresponding to the suspected abnormal structural feature based on contour information on the suspected abnormal structural feature; and, when no, inputting fetal ultrasound images corresponding to the suspected abnormal structural feature into the contour-identifiable feature-detecting model for analysis to acquire contour information analyzed by the contour-identifiable feature-detecting model as the contour information on structural features of fetal ultrasound images corresponding to the suspected abnormal structural feature and acquiring the value of geometric parameters corresponding to the suspected abnormal structural feature based on the contour information on the suspected abnormal structural feature.

As a third aspect, disclosed in the present invention is another apparatus for identification of fetal cross-sections based on ultrasound dynamic images, the apparatus comprising a memory, memorized with an executable program, and a processor, coupled with the memory, wherein the processor, calling the executable program memorized in the memory, implements the method for identification of fetal cross-sections based on ultrasound dynamic images disclosed by the first aspect in the present invention.

Compared with the prior art, there are beneficial effects of embodiments of the present invention as follows.

In the embodiments of the present invention, inputting each frame of a fetal ultrasound image from acquired multiple consecutive frames of fetal ultrasound images sequentially into a predetermined feature-detecting model for analysis; acquiring the sequentially exported analysis from the feature-detecting model as feature information for each frame of fetal ultrasound images; for each frame of fetal ultrasound images, the feature information comprising information on a part feature and a structural feature, the information on the part feature comprising at least a category of the part feature, the information on the structural feature comprising at least a category of the structural feature, each structural feature comprising at least a critical structural feature; and identifying a fetal cross-section by the categories of the part feature and the structural feature. Obviously, for a fetal ultrasound image, the implementation of the present invention may improve the identified accuracy, identified efficiency, and the standardization of the cross-section, by acquiring the part and structural features of consecutive multi-frame fetal ultrasound images, by identifying, without manual involvement, the cross-section through combining the part and structural features, by inputting fetal ultrasound images into a feature-detecting model for analysis.

BRIEF DESCRIPTION OF THE DRAWINGS

In order to illustrate the technical solutions in the embodiments of the present invention more clearly, a brief description of the attached drawings required for the description of the embodiments is provided as follows. Obviously, the attached drawings in the following description are only some of embodiments of the present invention, and other attached drawings may be acquired based on these drawings without any inventive effort by a person of ordinary skill in the art.

DETAILED DESCRIPTION OF THE PREFERRED EMBODIMENTS

For facilitating a better understanding of the solution of the present invention by persons in the art, it will be described clearly and completely below in connection with the attached drawings in the embodiments of the present invention. Obviously, the embodiments described are only some of the embodiments of the present invention, and not all them. All the other embodiments acquired without inventive efforts by those skilled in the art, based on the embodiments in the present invention, fall within the scope of protection of the present invention.

The terms "first", "second", and the like in the specification, the claims and the above-mentioned drawings of the present invention are used to identify different objects and are not intended to describe a particular sequence. In addition, the terms "comprise" and "include", and any derivatives and conjugations thereof, are intended to cover non-exclusive inclusion. For example, a process, method, apparatus, product, or device that comprises a series of steps or units is not limited to the listed steps or units, but optionally also comprises steps or units that are not listed, or optionally also comprises other steps or units that are inherent to those processes, methods, products, or devices.

The term "embodiment" herein means that a particular feature, structure or characteristic described in conjunction with an embodiment may be comprised in at least one embodiment of the present invention. The presence of the term in various places in the specification does not necessarily indicate the same embodiment, nor is it a separate or alternative embodiment that is mutually exclusive with other embodiments. It is understood, both explicitly and implicitly, by those skilled in the art that the embodiments described herein may be combined with other embodiments.

Disclosed in the present invention are a method and apparatus for identification of the fetal cross-sections based on ultrasound dynamic images, which, for a fetal ultrasound image, may improve the identified accuracy, identified efficiency and the standardization of the cross-section, by acquiring the part and structural features of consecutive multi-frame fetal ultrasound images, identifying, without manual involvement, the cross-section through combining the part and structural features, and inputting fetal ultrasound images into a feature-detecting model for analysis. Detailed descriptions are provided respectively as follows.

First Embodiment

Figure 1:
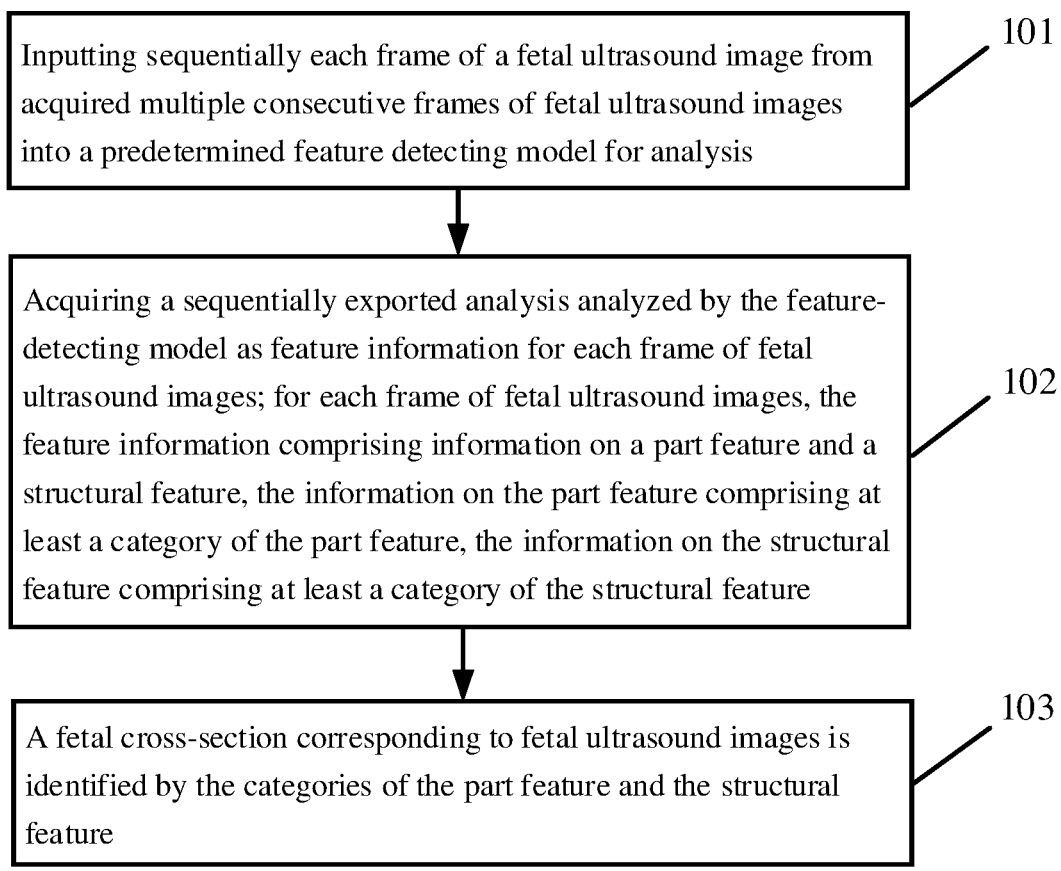
FIG. 1 is a process flow diagram of a method for identification of fetal cross-sections based on ultrasound dynamic images, as disclosed in embodiments of the present invention.

Please refer to FIG. 1, which is a process flow diagram of a method for identification of a fetal cross-sections based on ultrasound dynamic images as disclosed in the present embodiment of the invention. As shown in FIG. 1, the method for identification of fetal cross-sections based on ultrasound dynamic images may comprise:

At step 101, inputting each frame of a fetal ultrasound image from acquired multiple consecutive frames of fetal ultrasound images sequentially into a predetermined feature-detecting model for analysis.

In the present embodiment of the invention, a multi-frame fetal ultrasound image may be acquired consecutively at a predetermined frame rate, wherein the predetermined frame rate relates to the cross-section of fetal ultrasound images required, that is, the frame rate is determined based on the required cross-section of fetal ultrasound images, which is exemplified by that: the frame rate may be 30 frames per second if a cross-section of abdominal circumference is required, and may be 60 frames per second if a cross-section of four-cavity heart is required. There may be an improvement in acquiring efficiency and accuracy of the required cross-section of fetal ultrasound images, by determining a corresponding frame rate based on the required cross-section of fetal ultrasound images.

In the present embodiment of the invention, there is correspondingly only one frame number for each frame of fetal ultrasound images. Each fetal ultrasound image may be clearly distinguished, during the acquisition of the cross-section of fetal ultrasound images, by providing a unique frame number for each fetal ultrasound image, facilitating intelligent management of information on fetal ultrasound images and the cross-section thereof, which is exemplified by categories of the cross-section, examined and not examined cross-sections, etc.

In the present embodiment of the invention, the feature-detecting model may comprise at least one of a predetermined targeted detecting model, an instance splitting model, and a semantic splitting model, which may acquire information on part features and structural features of fetal ultrasound images, which is not limited herein.

At step 102, acquiring a sequentially exported analysis analyzed by the feature-detecting model as feature information for each frame of fetal ultrasound images, for each frame of fetal ultrasound images, the feature information may comprise information on a part feature and a structural feature, the information on the part feature comprising at least a category of the part feature, the information on the structural feature comprising at least a category of the structural feature.

In the present embodiment of the invention, for each frame of fetal ultrasound images, the part feature may comprise at least one of a category of a craniocerebral feature, a facial one, an abdominal one, a limb one, a thoracoabdominal one, an abdominopelvic one and a chest one, which is not limited herein, wherein the part features of each category may comprise the part features of at least one body orientation out of multiple body orientations, the multiple body orientations including a horizontal orientation, a sagittal one, and a coronal one, which is exemplified by that: a cranio-cerebral part feature may comprise a horizontal, a sagittal and a coronal cranio-cerebral cross-section. Further, for a fetal ultrasound image, the orientation of the structural feature is determined right after the determination of the orientation of the part feature, sharing the same orientation as the corresponding part feature. In the present embodiment of the invention, each structural feature may comprise at least a critical structural feature, wherein, for each frame of fetal ultrasound images, the critical structural feature is the feature that characterizes the cross-section of fetal ultrasound images, that is, the category of the cross-section is able to be identified based on the corresponding critical structural feature after acquiring that of fetal ultrasound images, wherein, for each frame of fetal ultrasound images, an amount of the critical structural feature may comprise at least one, which is exemplified by that: for a fetal ultrasound image, the critical structural feature may comprise the structural feature of the gastric vacuole and umbilical vein. Further, for a fetal ultrasound image, the structural features also include other structural features (non-critical structural features), which is exemplified by that: in the cross-section of abdominal circumference, the gastric vacuole and umbilical vein are critical structural features, whereas the liver, descending aorta, rib, and inferior vena cava are other structural features. For a fetal ultrasound image, the more structural features are included, the more the accuracy of identification of the cross-section may be improved.

In the present embodiment of the invention, for each frame of fetal ultrasound images, the part feature information may further comprise at least one of a confidence level (the probability to identify the category of the part feature), a graphic coordinate, a dimension, and a location probability for the part feature, and the same applies to the structural feature information, which is not limited herein, wherein the graphical coordinate may comprise a polygonal coordinate or an elliptical coordinate, and a polygonal coordinate may comprise an odd polygonal coordinate or an even polygonal coordinate, which is exemplified by: a pentagonal coordinate, a rectangular coordinate. The polygon coordinate is identified by the shape of the part feature or structural feature, which may improve the acquired accuracy of the coordinate for the part feature and/or structural feature. Further, for each frame of fetal ultrasound images, the structural feature information may also comprise a polygonal contour of the structural feature, which is exemplified by: a polygonal-contour coordinate. The more feature information is included, the more the accuracy of acquiring the corresponding cross-section of fetal ultrasound images and the identified accuracy of, subsequently, the suspected abnormal structural features may be improved.

At step 103, identifying a fetal cross-section by the categories of the part feature and the structural feature in each frame of fetal ultrasound images.

In the present embodiment of the invention, as an example, a gastric vacuole and a umbilical vein are the critical structural features for the cross-section of the abdominal circumference; a gastric vacuole and a gallbladder are the critical structural features for the cross-section of the gallbladder and umbilical vein. The cross-section of the corresponding fetal ultrasound image is identified as the cross-section of the abdominal circumference, when it is detected that the part feature is the abdominal feature and the structural features are the gastric vacuole feature and the umbilical vein feature; the cross-section of the corresponding fetal ultrasound image is identified as the cross-section of the gallbladder and umbilical vein, when it is detected that the part feature is the abdominal feature and the structural features are the gastric vacuole feature and the gallbladder feature. Further, for the corresponding fetal ultrasound image, the cross-section is identified as a standard cross-section when the cross-section includes, besides the critical structural features, also other structural features matching therewith, which is exemplified by that: the cross-section of abdominal circumference is identified as a standard cross-section of abdominal circumference, when the cross-section of abdominal circumference includes, besides the critical structural features such as a gastric vacuole and a umbilical vein, also other structural features such as liver, descending aorta, rib and inferior vena cava.

In an optional embodiment, after implementing the step 102, the method for identification of fetal cross-sections based on ultrasound dynamic images may further comprise: detecting all fetal ultrasound images to determine whether or not there exists a targeted fetal ultrasound image in which the features do not match the feature information of fetal ultrasound images; when yes, filtering all fetal ultrasound images to get all targeted fetal ultrasound images; eliminating, in each frame of the targeted fetal ultrasound image, the features not matching the feature information based on a predetermined feature-eliminating method; and acquiring the targeted fetal ultrasound image without the features not matching the feature information.

In the present optional embodiment, the feature-eliminating method may comprise at least one of a eliminating method, which may eliminate the features not matching the feature information on fetal ultrasound images, through feature smoothing, average value, amplitude limiting, LSTM (Long Short-Term Memory), etc., which is not limited herein.

It is to be noted that the first optional embodiment may be implemented before or after the step 103. For each frame of fetal ultrasound images in the step 103, the feature not matching the feature information thereof has been eliminated, when the first optional embodiment is implemented before the step 103. Eliminating the features not matching the feature information on fetal ultrasound images, before the identification of the corresponding cross-section of fetal ultrasound images, may lead to a reduction of the data processing volume, so as to improve the identified accuracy and identified efficiency of the cross-section of fetal ultrasound images.

In the present optional embodiment, implementing the subsequent steps, when it is detected in all fetal ultrasound images that there does not exist any targeted fetal ultrasound image that the features do not match with the feature information of fetal ultrasound images.

Obviously, in the present optional embodiment, further determining whether or not there exist features not matching the feature information on fetal ultrasound images, after acquiring the feature information thereon, and, when they exist, eliminating the features not matching the feature information, which may lead to a reduction of the data processing volume, so as to improve the identified accuracy and identified efficiency of the cross-section of fetal ultrasound images.

In an optional embodiment, elimination, in each frame of the targeted fetal ultrasound image, of the features not matching the feature information based on the predetermined feature-eliminating method and the acquisition of the targeted fetal ultrasound image without the features not matching the feature information may comprise: acquiring an average grayscale value in each frame of the targeted fetal ultrasound image, a plurality of former frames thereof, and a plurality of latter frames thereof; eliminating the feature information on the targeted fetal ultrasound image based on the average grayscale value of each frame of the targeted fetal ultrasound image to acquire the targeted fetal ultrasound image without the features not matching the feature information; or identifying locations of the features not matching the feature information of each frame of the targeted fetal ultrasound image, and deleting the features not matching the feature information based on corresponding locations to acquire the targeted fetal ultrasound image without the features not matching the feature information.

As an example, if finger features are shown in frame 15 in a part, whereas which should include the cranium and brain, of fetal ultrasound images, acquiring the average grayscale value of fetal ultrasound images, in frame 15, the former 4 frames of frame 15 and the latter 4 frames of frame 15, a total of 9 frames of fetal ultrasound images; eliminating the finger features in the part including cranium and brain in frame 15 of fetal ultrasound images based on the average grayscale value, then acquiring the eliminated frame 15 of fetal ultrasound images, or deleting the finger features directly in frame 15 thereof.

Obviously, in the present optional embodiment, filtering fetal ultrasound images to eliminate the features not matching the feature information on the targeted fetal ultrasound image, after the determination that the features not matching the feature information exist, by acquiring an average grayscale value in each frame of the targeted fetal ultrasound image, a plurality of former frames thereof, and a plurality of latter frames thereof; or deleting the features not matching the feature information directly, which may realize the elimination of the features not matching the feature information and improve the accuracy, reliability and efficiency for the elimination thereof.

In an optional embodiment, after implementing the step 103, the method for identification of fetal cross-sections based on ultrasound dynamic images may further comprise: detecting the cross-section corresponding to each frame of fetal ultrasound images to determine whether or not there exist features not matching the cross-section; and, when yes, deleting the features not matching the cross-section.

As an example, if cerebellar structural features are shown in a cross-section of abdominal circumference corresponding to fetal ultrasound images, since the cerebellar structural features are not matching the cross-section of abdominal circumference, the cerebellar structural features should be eliminated from the cross-section of abdominal circumference.

In the present optional embodiment, ending the present process, when it is detected in a cross-section of the corresponding fetal ultrasound images in which all features matching the cross-section, or implementing the subsequent step, that is, outputting the cross-sectional information on the corresponding cross-section of fetal ultrasound images.

Obviously, in the present optional embodiment, further detecting to determine whether or not there exist features not matching the cross-section, after acquiring the cross-section of the corresponding fetal ultrasound image; when yes, deleting the features not matching the feature information; which a cross-section with high accuracy may be acquired.

In an optional embodiment, structural features of each frame of fetal ultrasound images further comprise a confidence level of structural features and a location probability of structural features, the location probability of each structural feature being the probability of the structural feature showing in a particular position of corresponding fetal ultrasound images, the method for identification of fetal cross-sections based on ultrasound dynamic images may further comprise: identifying a cross-sectional score, for cross-sections corresponding to a present frame of fetal ultrasound images, based on, in the present frame of fetal ultrasound images, the confidence level of structural features, the location probability of structural features, and a weighted value of structural features; determining whether or not the cross-sectional score of the cross-section corresponding to the present frame of fetal ultrasound images is higher than that of a determined optimal cross-section, the optimal cross-section being the one with a highest cross-sectional score; when yes, updating a frame number of the present cross-section corresponding to the present frame of fetal ultrasound images as the one of the optimal cross-section, there being only one frame number for each frame of fetal ultrasound images; and, when no, acquiring a next frame of fetal ultrasound images as the present one and identifying the cross-sectional score for the cross-section corresponding to the present one based on the confidence level, the location probability, and the weighted value of structural features in the present one.

In the present optional embodiment, the equation for computing the cross-sectional score of the cross-section corresponding to the current frame of fetal ultrasound images is as follows.

$$S = \sum_{i=1}^{M} (P_i \times Q_i \times O_i)$$

For the corresponding cross-section of fetal ultrasound images of the current frame, S is the cross-sectional score, M is the total amount of structural features, $P_i$ is the confidence level of the $i^{th}$ structural feature, $Q_i$ is the position probability of the $i^{th}$ structural feature, and $O_i$ is the weighted value of the $i^{th}$ structural feature.

In the present optional embodiment, the optimal cross-section is the one with a highest cross-sectional score.

In the present optional embodiment, a weighted value (also named as weighting coefficient) of each structural feature is identified based on the effectiveness of the structural feature to demonstrate a cross-section, wherein the higher the effectiveness of a structural feature takes, the higher the weighted value thereof is, that is, the more important role the structural feature in the corresponding cross-section plays, wherein the structural features of each cross-section have their corresponding weighting values, that is, both the critical structural features and non-critical structural features of each cross-section have their corresponding weighting values. Further, the weighting value for each critical structural feature of each cross-section may be identical or different, and the weighting value for each non-critical structural feature of each cross-section may be identical or different. It is to be noted that, the weighting value of each critical structural feature is higher than of each non-critical structural feature (other structural feature). As an example, in the cross-section of thalamus, cavum septum pellucidum, thalamus and lateral ventricles are the critical structural features, whose weighting value is 1.0, while choroid plexus and lateral fissure are the non-critical structural features, whose weighting value is 0.5. As another example, in the cross-section of abdominal circumference, gastric vacuole and umbilical vein are the critical structural features, whose weighting value is 1.0, while liver, descending aorta, ribs, and inferior vena cava are the non-critical structural features, whose weighting value is 0.5.

In the present optional embodiment, outputting the information on a determined optimal cross-section frame (i.e., the optimal frame of fetal ultrasound images), after acquiring the optimal cross-section, wherein the information in the optimal frame of fetal ultrasound images may comprise frame number and the cross-sectional information on the cross-section therein, and please refer to the description of the corresponding content in the next optional embodiment for a description of the cross-sectional information on the cross-section therein, which is not be repeated hereby.

Obviously, in the present optional embodiment, computing further the cross-sectional score for the cross-section and updating instantaneously the cross-section with a highest cross-sectional score as the optimal cross-section, after acquiring the cross-sections of fetal ultrasound images, which may improve instantaneousness, efficiency and accuracy of the acquisition on the optimal cross-section.

In the present embodiment of the invention, it is to be noted that, computing the cross-sectional score for each cross-section, and identifying the cross-section with a highest cross-sectional score as the optimal cross-section, after acquiring all the cross-sections of fetal ultrasound images, which is also acceptable.

In an optional embodiment, after implementing the step 103, the method for identification of fetal cross-sections based on ultrasound dynamic images may further comprise: outputting the cross-sectional information for the cross-section corresponding to each frame of fetal ultrasound images.

In the present optional embodiment, for each cross-section, the cross-sectional information may comprise the information on the markers and/or the structures of the corresponding cross-section, wherein the markers of cross-section may comprise the frame number and/or the title for the cross-section corresponding to fetal ultrasound images, wherein the structural information on each corresponding cross-section may comprise at least one of a category of the structural feature, a graphical coordinate, a polygonal-contour coordinate, a location, a location probability, a dimension and a confidence level, which is not limited herein.

Obviously, in the present optional embodiment, outputting further the cross-sectional information on the cross-section corresponding to fetal ultrasound images, after acquiring the corresponding cross-section thereof, which facilitating the relevant personnel (e.g., the doctor) to have a clear acknowledgment of the growth and development of the fetus.

In an optional embodiment, after implementing the step 103, the method for identification of fetal cross-sections based on ultrasound dynamic images may further comprise: inputting all the cross-sections corresponding to fetal ultrasound image into the pre-trained neural network model (e.g., CNN model) for analysis, and acquiring the analysis, outputted by the neural network model, as the detecting result for the fetus corresponding to fetal ultrasound images.

In the present optional embodiment, further, inputting the cross-sectional information on each cross-section into the neural network model for analysis, which is also acceptable, which may improve the accuracy and reliability of the detecting result for the fetus of the corresponding fetal ultrasound image.

In the present optional embodiment, further, the growth and development of the fetus corresponding to fetal ultrasound images may be analyzed in combination with the pre-determined logical supervision rules and the analysis of the neural network model, wherein the logical supervision rules may include years of experience related to fetal detection by relevant personnel (e.g., fetal examination specialists).

Obviously, in the present optional embodiment, further, after acquiring the cross-section corresponding to fetal ultrasound images, inputting the cross-section corresponding to fetal ultrasound images into the neural network model for analysis, and acquiring the detection result of the fetus corresponding to fetal ultrasound images, thereby synthesizing the analysis of the fetal growth and development and thus acquiring an accurate fetal growth and development.

Obviously, for a fetal ultrasound image, the implementation of the method for identification of a fetal cross-sections based on ultrasound dynamic images as described in FIG. 1 may improve the identified accuracy, identified efficiency and the standardization for the cross-section, by acquiring the part and structural features in consecutive multi-frame fetal ultrasound images, by identifying, without manual involvement, the cross-section through combining the part and structural features, by inputting fetal ultrasound images into a feature-detecting model for analysis.

Second Embodiment

Figure 2:
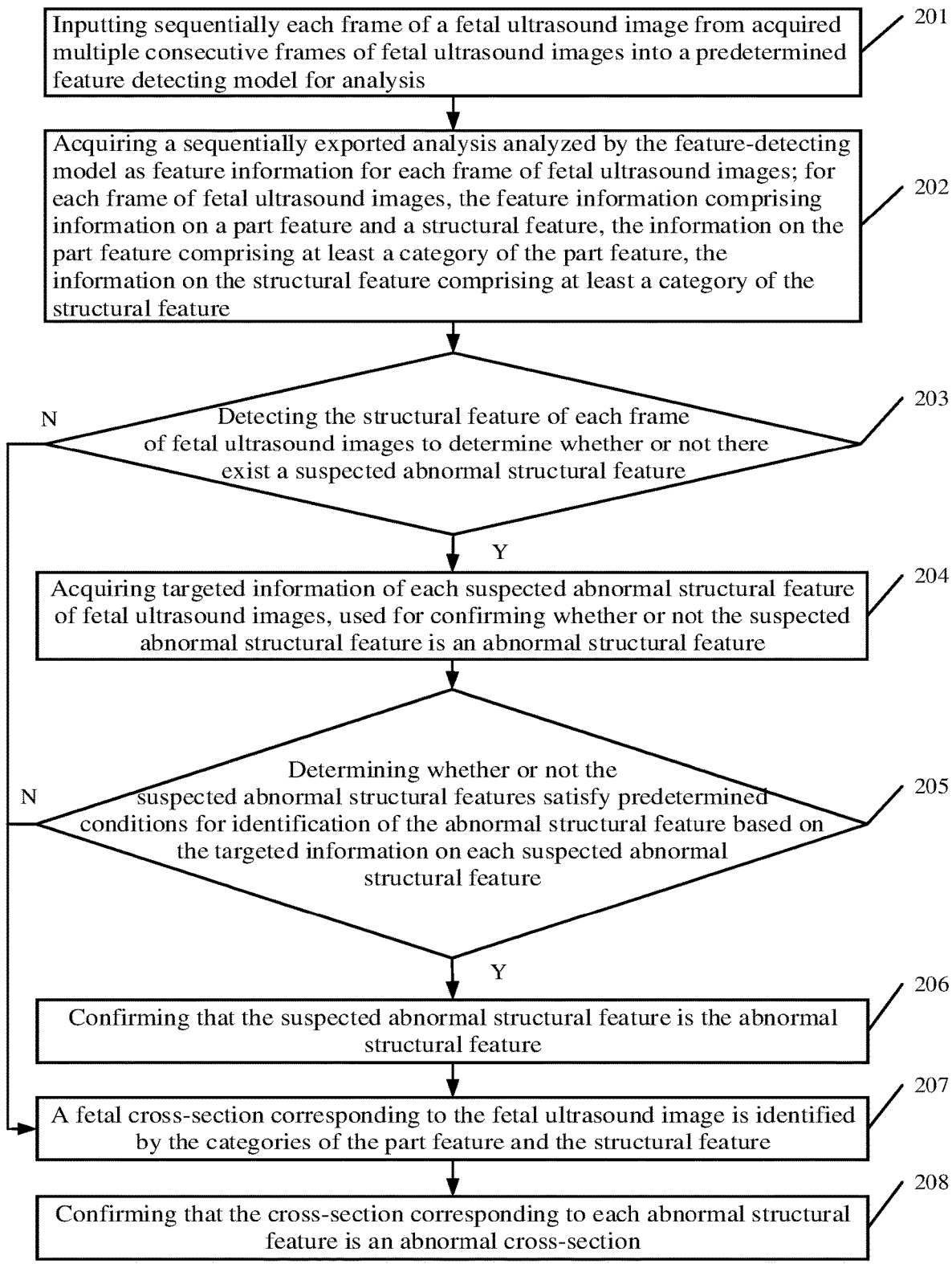
FIG. 2 is a process flow diagram of another method for identification of fetal cross-sections based on ultrasound dynamic images, as disclosed in embodiments of the present invention.

Please refer to FIG. 2, which is a process flow diagram of another method for identification of fetal cross-sections based on ultrasound dynamic images, as disclosed in the present embodiment of the invention. As shown in the FIG. 2, the method for identification of fetal cross-sections based on ultrasound dynamic images may further comprise:

At step 201, inputting each frame of a fetal ultrasound image from acquired multiple consecutive frames of fetal ultrasound images sequentially into a predetermined feature-detecting model for analysis.

At step 202, acquiring a sequentially exported analysis analyzed by the feature-detecting model as feature information for each frame of fetal ultrasound images; and, for each frame of fetal ultrasound images, the feature information comprising information on a part feature and a structural feature, the information on the part feature comprising at least a category of the part feature, the information on the structural feature comprising at least a category of the structural feature.

In the present embodiment of the invention, for each frame of fetal ultrasound images, each structural feature comprising at least a critical structural feature.

At step 203, detecting the structural feature of each frame of fetal ultrasound images to determine whether or not there exist a suspected abnormal structural feature; when yes, implementing the step 204; when no, ending the present process or implementing the step 207.

At step 204, acquiring targeted information on each suspected abnormal structural feature of fetal ultrasound images, used for confirming whether or not the suspected abnormal structural feature is an abnormal structural feature.

At step 205, determining whether or not the suspected abnormal structural features satisfy predetermined conditions for identification of the abnormal structural feature based on the targeted information on each suspected abnormal structural feature, when yes, implementing the step 206, and, when no, ending the present process or implementing the step 207.

At step 206, confirming that the suspected abnormal structural feature is the abnormal structural feature.

Obviously, in the present embodiment of the invention, after acquiring the structural feature of the fetal ultrasound feature, further determining whether or not there exist suspected abnormal structural features within the structural feature; when yes, determining whether or not the suspected abnormal structural features satisfy predetermined conditions for identification of the abnormal structural feature based on the targeted information on each suspected abnormal structural feature; when satisfy, confirming that the suspected abnormal structural feature is the abnormal structural feature; which may improve the identified accuracy of the existence of the suspected abnormal structural feature in fetal ultrasound images, so as to improve the identified accuracy of the existence of fetal abnormalities, thereby improving the identified accuracy of the cross-section corresponding to fetal ultrasound images.

At step 207, a fetal cross-section is identified by the categories of the part feature and the structural feature in each frame of fetal ultrasound images.

It is to be noted that, in the present embodiment of the invention, the steps from 203 to 206 have no relationship with the implementation of step 207, that is, the steps from 203 to 206 may implement before step 207 or after step 207 or may implement simultaneously with step 207, which is not limited herein.

In the present embodiment of the invention, regarding the description for step 201, step 202 and step 207, please refer to the detailed description of steps from 101 to 103 in the First Embodiment, which is not repeated hereby.

In an optional embodiment, the method for identification of fetal cross-sections based on ultrasound dynamic images may further comprise:

At step 208, confirming that the cross-section corresponding to each abnormal structural feature is an abnormal cross-section.

In the present embodiment of the invention, outputting the cross-sectional information on the abnormal cross-section, after the determination of the abnormal cross-section, wherein the cross-sectional information on the abnormal cross-section includes feature information on abnormal structural features and/or normal structural features. For a description of the feature information, please refer to the description of the relevant content in the present embodiment of the invention, which is not be repeated hereby.

In an optional embodiment, the determination of whether or not the suspected abnormal structural features satisfy the predetermined conditions for identification of the abnormal structural feature based on the targeted information on each suspected abnormal structural feature, may comprise: identifying an abnormal manifestation type, which manifests as a numerical manifestation type or a morphological manifestation type, corresponding to the suspected abnormal structural feature, based on the targeted information on each suspected abnormal structural feature; acquiring a value of geometric parameters corresponding to the suspected abnormal structural feature when the abnormal manifestation type thereof manifests as the numerical manifestation type; determining whether or not the value of geometric parameters corresponding to the suspected abnormal structural feature falls within a predetermined normal range of the parameters; when no, confirming that the suspected abnormal structural features satisfy the predetermined conditions for identification of the abnormal structural feature; determining whether or not the suspected abnormal structural features locate in a detecting area corresponding to the part feature of the suspected abnormal structural feature, when the abnormal structural feature of the suspected abnormal structural feature manifests as the morphological manifestation type; and, when no, confirming that the suspected abnormal structural features satisfy the predetermined conditions for identification of the abnormal structural feature.

In the present optional embodiment, the detecting area of each part feature may be identified by a detecting outline, such as a polygonal outline or an elliptical outline.

In the present optional embodiment, the targeted information on each suspected abnormal structural feature may comprise the category of features thereof; for each suspected abnormal structural feature, the geometric parameters may comprise a transverse diameter and/or a perimeter; and the more such geometric parameters are included, the better it is to improve the accuracy of the identification of abnormal structural features. Various structural features possess a normal range of the parameters, which may be the same or different. Further, different geometric parameters of the same structural feature possess different normal ranges of parameters. Further, the geometric parameter corresponding to each suspected abnormal structural feature may comprise scaled dimensions and/or actual dimensions. Specifically, further acquiring the actual dimensions corresponding to the suspected abnormal structural feature, after determining that the scaled dimensions corresponding to the suspected abnormal structural feature fall within a predetermined normal range of the corresponding parameters, and determining whether or not the actual dimensions corresponding to the suspected abnormal structural feature fall within a predetermined normal range of the corresponding parameters; when the actual dimensions do not fall within that, confirming that the suspected abnormal structural features satisfy the predetermined conditions for identification of the abnormal structural feature. It may be improved the identified accuracy of determining whether or not the suspected abnormal structural features satisfy predetermined conditions for identification of the abnormal structural feature, by comparing simultaneously the scaled dimensions and the actual dimensions of the suspected abnormal structural feature with the normal ranges of their own respectively, thereby improving the identified accuracy of determining whether or not the suspected abnormal structural feature is the abnormal structural feature. Further, modifying the title corresponding to the suspected abnormal structural feature based on the geometric parameters corresponding thereto. The category of the suspected abnormal structural feature may be clearly distinguished, by modifying the title thereof based on the geometric parameters thereof, which facilitates a subsequent review.

In the present optional embodiment, after determining that the suspected abnormal structural features locate in a detecting area corresponding to the part feature of the suspected abnormal structural feature, determining whether or not there exist the abnormal structural feature in a multi-frame fetal ultrasound image; and, when yes, confirming that the suspected abnormal structural features satisfy the predetermined conditions for identification of the abnormal structural feature, wherein the multi-frame fetal ultrasound image may be the first frame and subsequent consecutive or intermittent frames of fetal ultrasound images, which may improve the identified accuracy of determining whether or not the suspected abnormal structural features satisfy predetermined conditions for identification of the abnormal structural feature, thereby improving the identified accuracy of determining whether or not the suspected abnormal structural feature is abnormal structural feature.

In the present optional embodiment, it may be determined whether or not the suspected abnormal structural feature is abnormal structural feature, by computing the degree of similitude between the suspected abnormal structural feature and the corresponding normal structural feature, that is, it may be determined that the suspected abnormal structural features satisfy the conditions for identification of the abnormal structural feature, when the degree of similitude between the suspected abnormal structural feature and the corresponding normal structural feature is less than or equal to a predetermined threshold of the degree of similitude (e.g., 95%).

A few examples of suspected abnormal structural features of the numerical manifestation type and morphological manifestation type are provided respectively.

Numerical manifestation type: when the suspected abnormal structural feature is detected as a critical widening of the lateral ventricle, inputting the contour information on the critical widening of the lateral ventricle into the predetermined measuring model to analyze, so as to acquire a scaled transverse diameter thereof, and determining whether or not the scaled transverse diameter is greater than or equal to twelve pixels; and, when yes, confirming that the critical widening of the lateral ventricle is an abnormal structural feature. Further, computing the actual transverse diameter thereof based on the scaled transverse diameter and the scale of fetal ultrasound images, after acquiring the scaled transverse diameter thereof, determining whether or not the actual transverse diameter is greater than or equal to ten millimeters, and, when yes, confirming that the critical widening of the lateral ventricle is an abnormal structural feature. Further, confirming that the critical widening of the lateral ventricle is a normal structural feature, and modifying the critical widening of the lateral ventricle as a normal lateral ventricle, when it is determined that the scaled transverse diameter thereof is less than twelve pixels and/or that the actual transverse diameter thereof is less than ten millimeters. Modifying the critical widening of the lateral ventricle as the medium widening of the lateral ventricle, when it is determined that the scaled transverse diameter thereof ranges from twelve to fifteen pixels and/or that the actual transverse diameter thereof ranges from twelve to fifteen millimeter. Modifying the critical widening of the lateral ventricle as the hydrocephalus, when it is determined that the scaled transverse diameter thereof is larger than fifteen pixels and/or that the actual transverse diameter thereof is larger than fifteen millimeters.

Morphological manifestation type: when it is detected that the suspected abnormal structural feature is choroid plexus cyst, detecting whether or not the choroid plexus cyst locates in the detecting area of the lateral ventricle; and, when yes, confirming the choroid plexus cyst is the abnormal structural feature. Further, when it is detected that the choroid plexus cyst locates in the detecting area of the lateral ventricle, detecting whether or not there exist the choroid plexus cyst in four frames of fetal ultrasound images; and, when yes, confirming the choroid plexus cyst is the abnormal structural feature.

Obviously, in the present optional embodiment, when it is determined that suspected abnormal structural feature exist in fetal ultrasound images, determining whether or not the suspected abnormal structural features satisfy the predetermined conditions for identification of the abnormal structural feature, by acquiring the value of geometric parameters of the suspected abnormal structural feature; or by determining whether or not the suspected abnormal structural features locate in a detecting area corresponding to the part feature of the suspected abnormal structural feature, or by determining whether or not the suspected abnormal structural features match with the normal structural features, so as to realize the determination of the suspected abnormal structural feature, that is, so as to select different determining types based on the suspected abnormal structural feature of different abnormal manifestation types, which may improve the possibility, accuracy and efficiency of determining whether or not the suspected abnormal structural features satisfy the predetermined conditions for identification of the abnormal structural feature.

In an optional embodiment, the acquisition of the value of geometric parameters corresponding to the suspected abnormal structural feature, may comprise: for each frame of fetal ultrasound images, the structural feature information further comprises information on a contour; determining whether or not the feature-detecting model is a predetermined and contour-identifiable feature-detecting model; when yes, acquiring the value of geometric parameters corresponding to the suspected abnormal structural feature based on contour information on the suspected abnormal structural feature; and, when no, inputting fetal ultrasound images corresponding to the suspected abnormal structural feature into the contour-identifiable feature-detecting model for analysis to acquire contour information analyzed by the contour-identifiable feature-detecting model as the contour information on structural features of fetal ultrasound images corresponding to the suspected abnormal structural feature and acquiring the value of geometric parameters corresponding to the suspected abnormal structural feature based on the contour information on the suspected abnormal structural feature.

In the present optional embodiment, the contour-identifiable feature-detecting model may comprise at least one of an instance splitting model and/or a semantic splitting model etc. Further, the contour-identifiable feature-detecting model may be a model, which may identify directly the geometric parameters of the structural feature. When it is the case mentioned above, acquiring directly the outputted results from the contour-identifiable feature-detecting model as the geometric parameters corresponding to the structural feature.

Obviously, in the present optional embodiment, determining whether or not the feature-detecting model is a predetermined and contour-identifiable feature-detecting model; when yes, acquiring the value of geometric parameters corresponding to the suspected abnormal structural feature based on contour information; and, when no, acquiring the contour information analyzed by the contour-identifiable feature-detecting model; which may reduce the occurrence of failure to acquire geometric parameters due to the continuous computation of the geometric parameters adopting a non-contour-identifiable feature-detecting model, so as to ensure the acquisition of the value of geometric parameters of the abnormal structural feature.

Obviously, for a fetal ultrasound image, the implementation of the method for identification of a fetal cross-sections based on ultrasound dynamic images as described in FIG. 2 may improve the identified accuracy, identified efficiency and the standardization for the cross-section, by acquiring the part and structural features in consecutive multi-frame fetal ultrasound images, by identifying, without manual involvement, the cross-section through combining the part and structural features, by inputting fetal ultrasound images into a feature-detecting model for analysis. Additionally, it may also improve the identified accuracy of existence of the abnormal structural features in fetal ultrasound images and identified efficiency of existence of fetal abnormalities.

Third Embodiment

Figure 3:
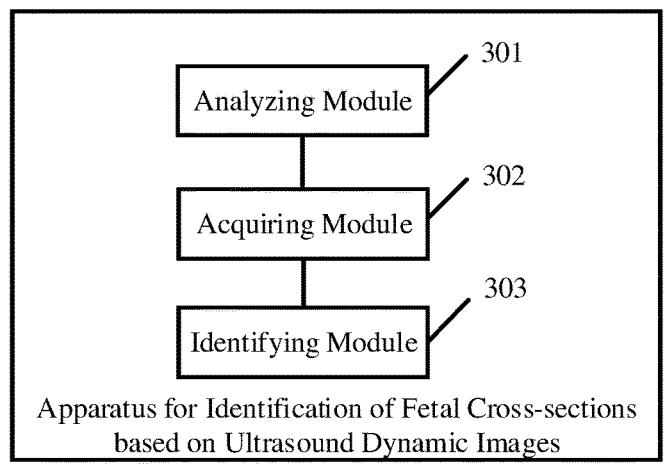
FIG. 3 is a structural diagram of a first apparatus for identification of fetal cross-sections based on ultrasound dynamic images, as disclosed in embodiments of the present invention.

Please refer to FIG. 3, which is a structural diagram of a first apparatus for identification of fetal cross-sections based on ultrasound dynamic images, as disclosed in the present embodiment of the invention. As shown in FIG. 3, the apparatus for identification of fetal cross-sections based on ultrasound dynamic images may comprise an analyzing module 301, used for sequentially inputting each frame of a fetal ultrasound image from acquired multiple consecutive frames of fetal ultrasound images into a predetermined feature-detecting model for analysis; an acquiring module 302, used for acquiring a sequentially exported analysis analyzed by the feature-detecting model as feature information for each frame of fetal ultrasound images; for each frame of fetal ultrasound images, the feature information comprising information on a part feature and a structural feature, the information on the part feature comprising at least a category of the part feature, the information on the structural feature comprising at least a category of the structural feature; and an identifying module 303, used for identifying the category of the part feature, the category of the structural feature and a cross-section corresponding to fetal ultrasound images, based on each frame of fetal ultrasound images.

Obviously, for a fetal ultrasound image, the implementation of the apparatus for identification of a fetal cross-sections based on ultrasound dynamic images as described in FIG. 3 may improve the identified accuracy, identified efficiency and the standardization for the cross-section, by acquiring the part and structural features in consecutive multi-frame fetal ultrasound images, by identifying, without manual involvement, the cross-section through combining the part and structural features, by inputting fetal ultrasound images into a feature-detecting model for analysis.

Figure 4:
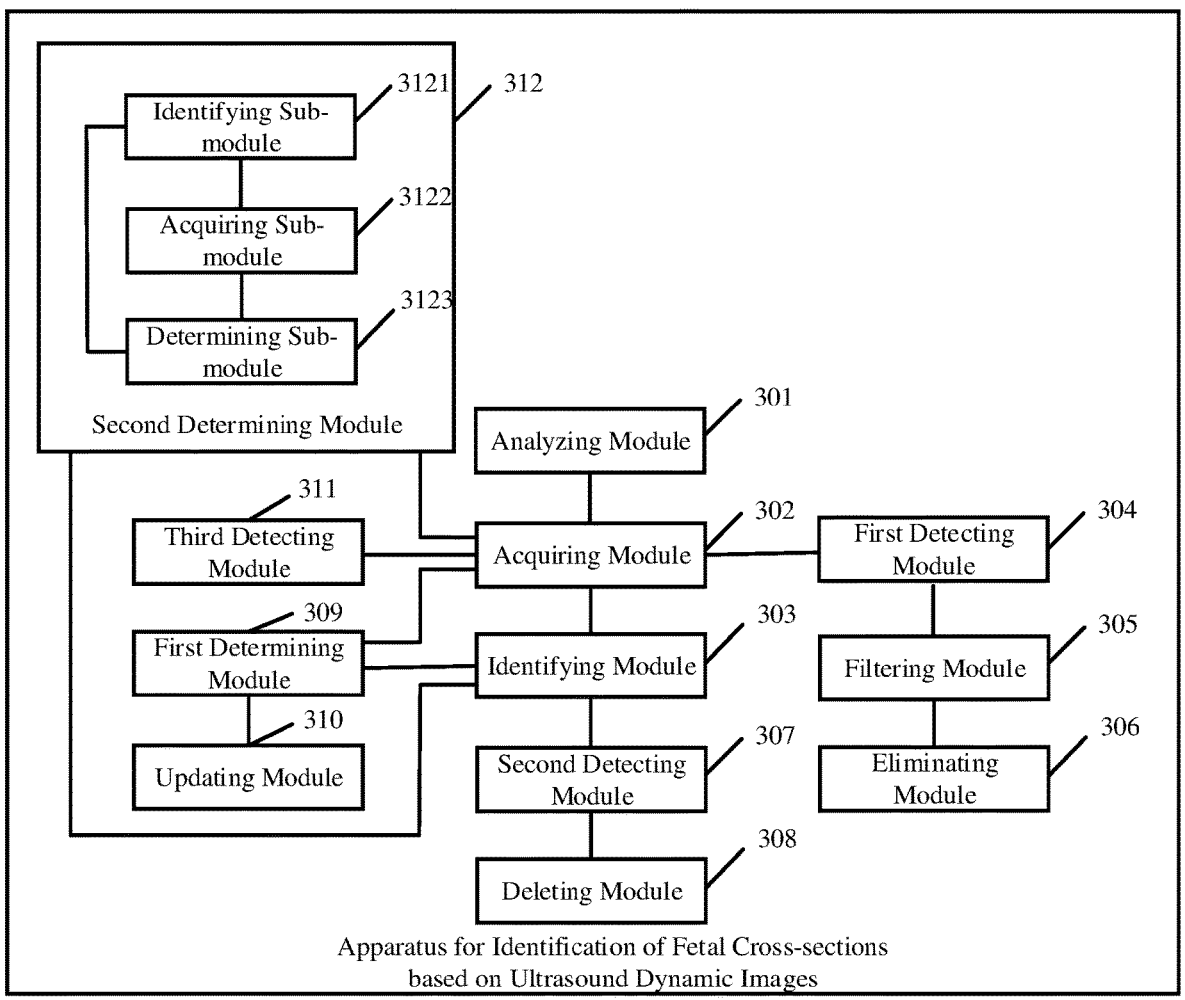
FIG. 4 is a structural diagram of a second apparatus for identification of fetal cross-sections based on ultrasound dynamic images, as disclosed in embodiments of the present invention.

In an optional embodiment, as shown in FIG. 4, the apparatus for identification of a fetal cross-sections based on ultrasound dynamic images may further comprise a first detecting module 304, used for detecting all fetal ultrasound images to determine whether or not there exists a targeted fetal ultrasound image in which the features do not match the feature information of fetal ultrasound images, after acquisition of the sequentially exported analysis of the feature-detecting model by the acquiring module 302 as feature information for each frame of fetal ultrasound images; a filtering module 305 used for filtering all fetal ultrasound images to get all targeted fetal ultrasound images, when the first detecting module 304 detects that the targeted fetal ultrasound image exist; and a eliminating module 306, used for eliminating, in each frame of the targeted fetal ultrasound image, the features not matching the feature information based on a predetermined feature-eliminating method, and acquiring the targeted fetal ultrasound image without the features not matching the feature information.

Obviously, the implementation of the apparatus as described in FIG. 4 may further determine whether or not there exist features not matching the feature information on fetal ultrasound images, after acquiring the feature information thereof, and, when they exist, eliminating the features not matching the feature information, which may lead to a reduction of the data processing volume, so as to improve the identified accuracy and identified efficiency of the cross-section thereof.

In an optional embodiment, the eliminating module 306 eliminates, in each frame of the targeted fetal ultrasound image, the features not matching the feature information based on the predetermined feature-eliminating method, and acquiring the targeted fetal ultrasound image without the features not matching the feature information, which specifically comprises steps as follows: acquiring an average grayscale value in each frame of the targeted fetal ultrasound image, a plurality of former frames thereof, and a plurality of latter frames thereof; eliminating the feature information on the targeted fetal ultrasound image based on the average grayscale value of each frame of the targeted fetal ultrasound image to acquire the targeted fetal ultrasound image without the features not matching the feature information; or identifying locations of the features not matching the feature information of each frame of the targeted fetal ultrasound image, and deleting the features not matching the feature information based on corresponding locations to acquire the targeted fetal ultrasound image without the features not matching the feature information.

Obviously, the implementation of the apparatus as described in FIG. 4 may further eliminate the features not matching the feature information on fetal ultrasound images, after determining that features not matching the feature information exist, by acquiring an average grayscale value in each frame of the targeted fetal ultrasound image, a plurality of former frames thereof, and a plurality of latter frames thereof, which may realize the elimination of the features not matching the feature information and improve the accuracy, reliability and efficiency for the elimination thereof.

In an optional embodiment, as shown in FIG. 4, the apparatus for identification of a fetal cross-sections based on ultrasound dynamic images may further comprise a second detecting module 307, used for that the identifying module 303 detects the cross-section corresponding to each frame of fetal ultrasound images to determine whether or not there exist features not matching the cross-section, after identification of the fetal cross-section by the categories of the part feature and the structural feature in each frame of fetal ultrasound images; and a deleting module 308, used for deleting the features not matching the cross-section, when the second detecting module 307 detects that features not matching the cross-section exist.

Obviously, the implementation of the apparatus as described in FIG. 4 may further detect whether or not there exist features not matching the cross-section, after acquiring the cross-section corresponding to fetal ultrasound images, and, when they exist, deleting the features not matching the feature information, which a cross-section with high accuracy may be acquired.

In an optional embodiment, structural features of each frame of fetal ultrasound images further comprise a confidence level of structural features and a location probability of structural features, the location probability of each structural feature being the probability of the structural feature showing in a particular position of corresponding fetal ultrasound images; as shown in the FIG. 4, the apparatus for identification of a fetal cross-sections based on ultrasound dynamic images may further comprise the identifying module 303, further used for identifying a cross-sectional score, for cross-sections corresponding to a present frame of fetal ultrasound images, based on, in the present frame of fetal ultrasound images, the confidence level of structural features, the location probability of structural features, and a weighted value of structural features; a first determining module 309, used for determining whether or not the cross-sectional score of the cross-section corresponding to the present frame of fetal ultrasound images is higher than that of a determined optimal cross-section, the optimal cross-section being the one with a highest cross-sectional score; an updating module 310, used for updating a frame number of the present cross-section corresponding to the present frame of fetal ultrasound images as the one of the optimal cross-section, when the first determining module 309 determines that the specified condition is positive, there being only one frame number for each frame of fetal ultrasound images; and the acquiring module 302, further used for acquiring the next frame of fetal ultrasound images as the present one, and the identifying module 303 identifies the cross-sectional score for the cross-section corresponding to the present one based on the confidence level, the location probability, and the weighted value of structural features in the present one, when the first determining module 309 determines that the specified condition is negative.

Obviously, the implementation of the apparatus as described in FIG. 4 may further compute the cross-sectional score of the cross-section, after acquiring the cross-section of fetal ultrasound images, and updating instantaneously the cross-section with a highest cross-sectional score as the optimal cross-section, which may improve the instantaneousness, efficiency and accuracy of the acquisition on the optimal cross-section.

In an optional embodiment, as shown in FIG. 4, the apparatus for identification of a fetal cross-sections based on ultrasound dynamic images may further comprise a third detecting module 311, used for detecting the structural feature of each frame of fetal ultrasound images to determine whether or not there exist a suspected abnormal structural feature, after the acquiring module 302 acquires the sequentially exported analysis of the feature-detecting model as feature information for each frame of fetal ultrasound images; the acquiring module 302, further used for acquiring targeted information on each suspected abnormal structural feature of fetal ultrasound images, used for confirming whether or not the suspected abnormal structural feature is an abnormal structural feature, when the third detecting module 311 detects that suspected abnormal structural features exist within the structural feature of fetal ultrasound images; a second determining module 312, used for determining whether or not the suspected abnormal structural features satisfy predetermined conditions for identification of the abnormal structural feature based on the targeted information on each suspected abnormal structural feature; and the identifying module 303, further used for confirming that the suspected abnormal structural feature is the abnormal structural feature and confirming that the cross-section corresponding to each abnormal structural feature is an abnormal cross-section, when the second determining module 312 determines that the suspected abnormal structural features satisfy the predetermined conditions for identification of the abnormal structural feature.

Obviously, the implementation of the apparatus as described in FIG. 4 may further determine whether or not there exist suspected abnormal structural features within the structural feature, after acquiring the structural feature of fetal ultrasound images, when they exist, then determining whether or not the suspected abnormal features satisfy the predetermined conditions for identification of the abnormal structural feature, and, when satisfy, then confirming that the suspected abnormal structural feature is the abnormal structural feature, which may improve identified accuracy of the existence of the abnormal structural feature in fetal ultrasound images, thereby improving the identified accuracy of the existence of fetal abnormalities.

In an optional embodiment, as shown in FIG. 4, the second determining module 312 may comprise: an identifying sub-module 3121, used for identifying an abnormal manifestation type, which manifests as a numerical manifestation type or a morphological manifestation type, corresponding to the suspected abnormal structural feature, based on the targeted information on each suspected abnormal structural feature; an acquiring sub-module 3122, used for acquiring a value of geometric parameters corresponding to the suspected abnormal structural feature when the abnormal manifestation type thereof manifests as the numerical manifestation type; a determining sub-module 3123, used for determining whether or not the value of geometric parameters corresponding to the suspected abnormal structural feature falls within a predetermined normal range of the parameters.

The identifying sub-module 3121 is further used for confirming that the suspected abnormal structural features satisfy the predetermined conditions for identification of the abnormal structural feature; for each suspected abnormal structural feature, the geometric parameters comprising a transverse diameter and/or a perimeter, when the determining sub-module 3123 determines that the geometric parameters corresponding to the suspected abnormal structural feature does not fall within a predetermined normal range of the parameters.

The determining sub-module 3123 is further used for determining whether or not the suspected abnormal structural features locate in a detecting area corresponding to the part feature of the suspected abnormal structural feature, when the abnormal structural feature of the suspected abnormal structural feature manifests as the morphological manifestation type.

The identifying sub-module 3121 is further used for confirming that the suspected abnormal structural features satisfy the predetermined conditions for identification of the abnormal structural feature, when the determining sub-module 3123 determines that the suspected abnormal structural feature does not locate in the detecting area corresponding to the part feature of the suspected abnormal structural feature.

Obviously, the implementation of the apparatus as described in FIG. 4 may further determine whether or not the suspected abnormal structural features satisfy the predetermined conditions for identification of the abnormal structural feature, by determining that suspected abnormal structural feature exist in fetal ultrasound images, by acquiring the value of geometric parameters of the suspected abnormal structural feature, or by determining whether or not the suspected abnormal structural features locate in the detecting area corresponding to the part feature, or by determining whether or not the suspected abnormal structural features match with the normal structural features, so as to realize the determination of the suspected abnormal structural feature, that is, so as to select different determining types based on the suspected abnormal structural feature of different abnormal manifestation types, which may improve the possibility, accuracy and efficiency of determining whether or not the suspected abnormal structural features satisfy the predetermined conditions for identification of the abnormal structural feature.

In an optional embodiment, as shown in FIG. 4, the acquiring sub-module 3122 acquires the geometric parameters corresponding to the suspected abnormal structural feature, which specifically comprises steps as follows: for each frame of fetal ultrasound images, the structural feature information further comprising the information on contour; determining whether or not the feature-detecting model is a predetermined and contour-identifiable feature-detecting model; when yes, acquiring the value of geometric parameters corresponding to the suspected abnormal structural feature based on contour information on the suspected abnormal structural feature; and, when no, inputting fetal ultrasound images corresponding to the suspected abnormal structural feature into the contour-identifiable feature-detecting model for analysis to acquire contour information analyzed by the contour-identifiable feature-detecting model as the contour information on structural features of fetal ultrasound images corresponding to the suspected abnormal structural feature and acquiring the value of geometric parameters corresponding to the suspected abnormal structural feature based on the contour information on the suspected abnormal structural feature.

Obviously, the implementation of the apparatus as described in FIG. 4 may further determine whether or not the feature-detecting model is a predetermined and contour-identifiable feature-detecting model; when yes, acquiring the value of geometric parameters corresponding to the suspected abnormal structural feature based on contour information; and, when no, acquiring the contour information analyzed by the contour-identifiable feature-detecting model; which may reduce the occurrence of failure to acquire geometric parameters due to the continuous computation of the geometric parameters adopting a non-contour-identifiable feature-detecting model, so as to ensure the acquisition of the value of geometric parameters of the abnormal structural feature.

Fourth Embodiment

Figure 5:
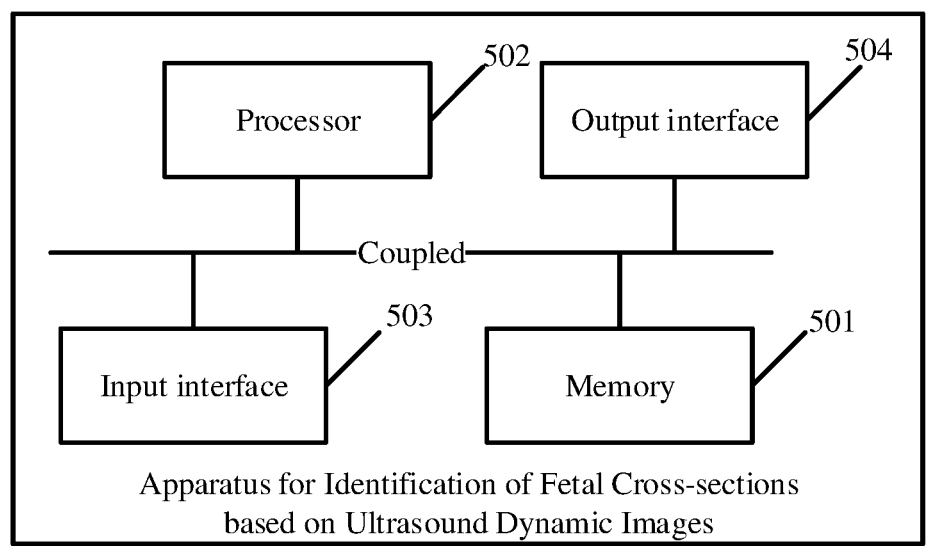
FIG. 5 is a structural diagram of a third apparatus for identification of fetal cross-sections based on ultrasound dynamic images, as disclosed in embodiments of the present invention.

Please refer to FIG. 5, which is a third apparatus for identification of fetal cross-sections based on ultrasound dynamic images. As shown in FIG. 5, the apparatus for identification of fetal cross-sections based on ultrasound dynamic images may comprise a memory 501 memorized with an executable program, and a processor 502 coupled with the memory 501, or may further comprise an input interface 503 and an output interface 504 coupled with the processor 502; wherein the processor 502, calling the executable program memorized in the memory 501, implements the method for identification of fetal cross-sections based on ultrasound dynamic images described by the First Embodiment or the Second Embodiment.

Fifth Embodiment

The present embodiment of the invention discloses a computer-readable memory medium that memorizes a computer program for electronic data interchange, wherein the computer program enables the computer to implement the method for identification of fetal cross-sections based on ultrasound dynamic images, described by the First Embodiment or the Second Embodiment.

Sixth Embodiment

The present embodiment of the invention discloses a computer program product comprising a non-instantaneous computer readable memory medium memorized with a computer program, the computer program enabling the computer to implement the steps in the method of identification of fetal cross-sections based on ultrasound dynamic images, described in the First Embodiment or the Second Embodiment.

It is only schematic to describe the aforementioned embodiment of the apparatus. The modules described as separate components may or may not be physically separated, and the modules used as components for display may or may not be physical modules, that is, they may be located in the same place or may be distributed to a plurality of network modules. Some or all these modules may be selected according to practical demands to achieve the purpose of the solution of the present embodiment. It may be understood and implemented by a person of ordinary skill in the art without inventive effort.

With the specific description of the above embodiments, it is clear to those skilled in the art that the various implementations may be implemented with the aid of software plus the necessary common hardware platform, and of course, with the aid of hardware. Based on this understanding, the above technical solutions that essentially or contribute to the prior art may be embodied in the form of a software product which may be memorized in a computer-readable memory medium, the memory medium including Read-Only Memory, Random Access Memory, Programmable Read-only Memory, Erasable Programmable Read Only Memory, One-time Programmable Read-Only Memory, Electrically-Erasable Programmable Read-Only Memory, Compact Disc Read-Only Memory, other Compact Disc Memory, Disk Memory, Tape Memory or any other computer-readable medium that may be used to carry or memorize data.

Finally, it should be noted that the method and apparatus for identification of fetal cross-sections based on ultrasound dynamic images disclosed in the embodiments of the present invention are only preferred embodiments of the present invention, and are only used to illustrate the technical solutions of the present invention, but not to limit them. Despite the detailed description of the invention with reference to the aforementioned embodiments, it should be understood, by those skilled in the art, that the technical solutions recorded in the aforementioned embodiments may still be modified, or equivalent substitutions for some of the technical features thereof may be made; which the essence of the corresponding technical solutions of these modifications or substitutions is without departing from the spirit and scope of the technical solutions of the various embodiments of the invention.

The invention claimed is:

1. A method for identification of fetal cross-sections based on ultrasound dynamic images, comprising:
   inputting each frame of a fetal ultrasound image from acquired multiple consecutive frames of fetal ultrasound images sequentially into a predetermined feature-detecting model for analysis;
   acquiring a sequentially exported analysis analyzed by the feature-detecting model as feature information for each frame of fetal ultrasound images; for each frame of fetal ultrasound images, the feature information comprising information on a part feature and a structural feature, the information on the part feature comprising at least a category of the part feature, the information on the structural feature comprising at least a category of the structural feature, each structural feature comprising at least a critical structural feature;
   identifying a fetal cross-section by the categories of the part feature and the structural feature;
   wherein structural features of each frame of fetal ultrasound images further comprise a confidence level of structural features and a location probability of structural features, the location probability of each structural feature being the probability of the structural feature showing in a particular position of corresponding fetal ultrasound images;
   the method further comprises:
   identifying a cross-sectional score for cross-sections corresponding to a present frame of fetal ultrasound images based on, in the present frame of fetal ultrasound images, the confidence level of structural features, the location probability of structural features, and a weighted value of structural features;
   determining whether or not the cross-sectional score of the cross-section corresponding to the present frame of fetal ultrasound images is higher than that of a determined optimal cross-section, the optimal cross-section being the one with a highest cross-sectional score; and
   when YES, updating a frame number of the present cross-section corresponding to the present frame of fetal ultrasound images as the one of the optimal cross-section, there being only one frame number for each frame of fetal ultrasound images.

2. The method for identification of fetal cross-sections based on ultrasound dynamic images according to claim 1, after acquisition of the sequentially exported analysis of the feature-detecting model as feature information for each frame of fetal ultrasound images, further comprising:
   detecting all fetal ultrasound images to determine whether or not there exists a targeted fetal ultrasound image in which the features do not match the feature information of fetal ultrasound images;
      when YES, filtering all fetal ultrasound images to get all targeted fetal ultrasound images;
   eliminating, in each frame of the targeted fetal ultrasound image, the features not matching the feature information based on a predetermined feature-eliminating method; and
   acquiring the targeted fetal ultrasound image without the features not matching the feature information.

3. The method for identification of fetal cross-sections based on ultrasound dynamic images according to claim 2, wherein elimination, in each frame of the targeted fetal ultrasound image, of the features not matching the feature information based on the predetermined feature-eliminating method and the acquisition of the targeted fetal ultrasound image without the features not matching the feature information comprise:
   acquiring an average grayscale value in each frame of the targeted fetal ultrasound image, a plurality of former frames thereof, and a plurality of latter frames thereof;
   eliminating the feature information on the targeted fetal ultrasound image based on the average grayscale value of each frame of the targeted fetal ultrasound image to acquire the targeted fetal ultrasound image without the features not matching the feature information; or
   identifying locations of the features not matching the feature information of each frame of the targeted fetal ultrasound image and deleting the features not matching the feature information based on corresponding locations to acquire the targeted fetal ultrasound image without the features not matching the feature information.

4. The method for identification of fetal cross-sections based on ultrasound dynamic images according to claim 1, after identification of the fetal cross-section by the categories of the part feature and the structural feature in each frame of fetal ultrasound images, further comprising:
   detecting the cross-section corresponding to each frame of fetal ultrasound images to determine whether or not there exist features not matching the cross-section; and
   when YES, deleting the features not matching the cross-section.

5. The method for identification of fetal cross-sections based on ultrasound dynamic images according to claim 1, further comprising:
   when NO, acquiring a next frame of fetal ultrasound images as the present one and identifying the cross-sectional score for the cross-section corresponding to the present one based on the confidence level, the location probability, and the weighted value of structural features in the present one.

6. The method for identification of fetal cross-sections based on ultrasound dynamic images according to claim 1, after acquisition of the sequentially exported analysis of the feature-detecting model as feature information for each frame of fetal ultrasound images, further comprising:
   detecting the structural feature of each frame of fetal ultrasound images to determine whether or not there exist a suspected abnormal structural feature;
      when YES, acquiring targeted information on each suspected abnormal structural feature of fetal ultrasound images, used for confirming whether or not the suspected abnormal structural feature is an abnormal structural feature;
   determining whether or not the suspected abnormal structural features satisfy predetermined conditions for identification of the abnormal structural feature based on the targeted information on each suspected abnormal structural feature; and
      when YES, confirming that the suspected abnormal structural feature is the abnormal structural feature and confirming that the cross-section corresponding to each abnormal structural feature is an abnormal cross-section.

7. The method for identification of fetal cross-sections based on ultrasound dynamic images according to claim 6, wherein the determination of whether or not the suspected abnormal structural features satisfy the predetermined conditions for identification of the abnormal structural feature based on the targeted information on each suspected abnormal structural feature comprises:

identifying an abnormal manifestation type, which manifests as a numerical manifestation type or a morphological manifestation type, corresponding to the suspected abnormal structural feature, based on the targeted information on each suspected abnormal structural feature;

acquiring a value of geometric parameters corresponding to the suspected abnormal structural feature when the abnormal manifestation type thereof manifests as the numerical manifestation type;

determining whether or not the value of geometric parameters corresponding to the suspected abnormal structural feature falls within a predetermined normal range of the parameters;

when NO, confirming that the suspected abnormal structural features satisfy the predetermined conditions for identification of the abnormal structural feature; for each suspected abnormal structural feature, the geometric parameters comprising a transverse diameter and/or a perimeter;

determining whether or not the suspected abnormal structural features locate in a detecting area corresponding to the part feature of the suspected abnormal structural feature, when the abnormal structural feature of the suspected abnormal structural feature manifests as the morphological manifestation type; and when NO, confirming that the suspected abnormal structural features satisfy the predetermined conditions for identification of the abnormal structural feature.

8. The method for identification of fetal cross-sections based on ultrasound dynamic images according to claim 7, wherein the acquisition of the value of geometric parameters corresponding to the suspected abnormal structural feature comprises:

for each frame of fetal ultrasound images, the structural feature information further comprises information on a contour;

determining whether or not the feature-detecting model is a predetermined and contour-identifiable feature-detecting model;

when YES, acquiring the value of geometric parameters corresponding to the suspected abnormal structural feature based on contour information on the suspected abnormal structural feature; and when NO, inputting fetal ultrasound images corresponding to the suspected abnormal structural feature into the contour-identifiable feature-detecting model for analysis to acquire contour information analyzed by the contour-identifiable feature-detecting model as the contour information on structural features of fetal ultrasound images corresponding to the suspected abnormal structural feature and acquiring the value of geometric parameters corresponding to the suspected abnormal structural feature based on the contour information on the suspected abnormal structural feature.

9. An apparatus for identification of fetal cross-sections based on ultrasound dynamic images, comprising a processor configured as:

an analyzing module to sequentially inputting each frame of a fetal ultrasound image from acquired multiple consecutive frames of fetal ultrasound images into a predetermined feature-detecting model for analysis;

an acquiring module, to acquire a sequentially exported analysis analyzed by the feature-detecting model as feature information for each frame of fetal ultrasound images; for each frame of fetal ultrasound images, the feature information comprising information on a part feature and a structural feature, the information on the part feature comprising at least a category of the part feature, the information on the structural feature comprising at least a category of the structural feature; and an identifying module, to identify the category of the part feature, the category of the structural feature and a cross-section corresponding to fetal ultrasound images, based on each frame of fetal ultrasound images;

wherein structural features of each frame of fetal ultrasound images further comprise a confidence level of structural features and a location probability of structural features, the location probability of each structural feature being the probability of the structural feature showing in a particular position of corresponding fetal ultrasound images;

the processor further configured as:

the identifying module to identify a cross-sectional score, for cross-sections corresponding to a present frame of fetal ultrasound images, based on, in the present frame of fetal ultrasound images, the confidence level of structural features, the location probability of structural features, and a weighted value of structural features;

a first determining module to determine whether or not the cross-sectional score of the cross-section corresponding to the present frame of fetal ultrasound images is higher than that of a determined optimal cross-section, the optimal cross-section being the one with a highest cross-sectional score; and an updating module to update a frame number of the present cross-section corresponding to the present frame of fetal ultrasound images as the one of the optimal cross-section, when the first determining module determines that the specified condition is positive, there being only one frame number for each frame of fetal ultrasound images.

10. An apparatus for identification of fetal cross-sections based on ultrasound dynamic images, comprising:

a memory, memorized with an executable program, and a processor, coupled with the memory, wherein the processor, calling the executable program memorized in the memory, implements the method for identification of fetal cross-sections based on ultrasound dynamic images according to claim 1.

11. An apparatus for identification of fetal cross-sections based on ultrasound dynamic images, comprising:

a memory, memorized with an executable program, and a processor, coupled with the memory, wherein the processor, calling the executable program memorized in the memory, implements the method for identification of fetal cross-sections based on ultrasound dynamic images according to claim 2.

12. An apparatus for identification of fetal cross-sections based on ultrasound dynamic images, comprising:

a memory, memorized with an executable program, and a processor, coupled with the memory, wherein the processor, calling the executable program memorized in the memory, implements the method for identification of fetal cross-sections based on ultrasound dynamic images according to claim 3.

13. An apparatus for identification of fetal cross-sections based on ultrasound dynamic images, comprising:

a memory, memorized with an executable program, and a processor, coupled with the memory,
wherein the processor, calling the executable program memorized in the memory, implements the method for identification of fetal cross-sections based on ultrasound dynamic images according to claim 4.

14. An apparatus for identification of fetal cross-sections based on ultrasound dynamic images, comprising:
a memory, memorized with an executable program, and
a processor, coupled with the memory,
wherein the processor, calling the executable program memorized in the memory, implements the method for identification of fetal cross-sections based on ultrasound dynamic images according to claim 5.

15. An apparatus for identification of fetal cross-sections based on ultrasound dynamic images, comprising:
a memory, memorized with an executable program, and
a processor, coupled with the memory,
wherein the processor, calling the executable program memorized in the memory, implements the method for identification of fetal cross-sections based on ultrasound dynamic images according to claim 6.

16. An apparatus for identification of fetal cross-sections based on ultrasound dynamic images, comprising:
a memory, memorized with an executable program, and
a processor, coupled with the memory,
wherein the processor, calling the executable program memorized in the memory, implements the method for identification of fetal cross-sections based on ultrasound dynamic images according to claim 7.

17. An apparatus for identification of fetal cross-sections based on ultrasound dynamic images, comprising:
a memory, memorized with an executable program, and
a processor, coupled with the memory,
wherein the processor, calling the executable program memorized in the memory, implements the method for identification of fetal cross-sections based on ultrasound dynamic images according to claim 8.

* * * * *